US008059562B2

(12) United States Patent
Iyer et al.

(10) Patent No.: US 8,059,562 B2
(45) Date of Patent: Nov. 15, 2011

(54) LISTENER MECHANISM IN A DISTRIBUTED NETWORK SYSTEM

(75) Inventors: Sreeram P. Iyer, Sunnyvale, CA (US); Atul Mahamuni, San Jose, CA (US)

(73) Assignee: Nokia Corporation, Espoo (FI)

( * ) Notice: Subject to any disclaimer, the term of this patent is extended or adjusted under 35 U.S.C. 154(b) by 1875 days.

(21) Appl. No.: 10/965,960

(22) Filed: Oct. 18, 2004

(65) Prior Publication Data

US 2006/0083177 A1 Apr. 20, 2006

(51) Int. Cl.
*H04L 12/28* (2006.01)
(52) U.S. Cl. ........................................ 370/255; 370/389
(58) Field of Classification Search .................. 370/252, 370/216, 255, 389; 709/226
See application file for complete search history.

(56) References Cited

U.S. PATENT DOCUMENTS

| 5,872,783 | A | * | 2/1999 | Chin | 370/395.32 |
|---|---|---|---|---|---|
| 5,917,820 | A | * | 6/1999 | Rekhter | 370/392 |
| 6,128,296 | A | * | 10/2000 | Daruwalla et al. | 370/389 |
| 6,128,298 | A | * | 10/2000 | Wootton et al. | 370/392 |
| 6,163,797 | A | * | 12/2000 | Eckley et al. | 709/203 |
| 6,404,766 | B1 | * | 6/2002 | Kitai et al. | 370/392 |
| 6,735,198 | B1 | * | 5/2004 | Edsall et al. | 370/389 |
| 6,779,039 | B1 | * | 8/2004 | Bommareddy et al. | 709/238 |
| 6,788,680 | B1 | * | 9/2004 | Perlman et al. | 370/389 |
| 6,839,346 | B1 | * | 1/2005 | Kametani | 370/389 |
| 6,856,621 | B1 | * | 2/2005 | Artes | 709/238 |
| 7,193,996 | B2 | * | 3/2007 | Dobbins et al. | 370/392 |
| 7,266,088 | B1 | * | 9/2007 | Virgin | 370/252 |
| 7,274,700 | B2 | * | 9/2007 | Jin et al. | 370/392 |
| 7,397,762 | B1 | * | 7/2008 | Firoiu et al. | 370/230 |
| 2001/0021176 | A1 | * | 9/2001 | Mimura et al. | 370/235 |
| 2005/0005023 | A1 | * | 1/2005 | Dobbins et al. | 709/238 |
| 2005/0111364 | A1 | * | 5/2005 | Hipp | 370/230 |
| 2006/0031843 | A1 | * | 2/2006 | Romero | 718/104 |
| 2006/0045098 | A1 | * | 3/2006 | Krause | 370/396 |
| 2006/0047818 | A1 | * | 3/2006 | Kruglick et al. | 709/227 |

OTHER PUBLICATIONS

"*Transmission Control Protocol*", DARPA Internet Program Protocol Specification, Information Sciences Institute, Sep. 1981, RFC: 793, pp. 1-85.

* cited by examiner

*Primary Examiner* — Ricky Ngo
*Assistant Examiner* — Dewanda Samuel
(74) *Attorney, Agent, or Firm* — Alston & Bird LLP

(57) ABSTRACT

A method of controlling a packet flow in a distributed network system comprising a plurality of network nodes having the same destination address is disclosed. Network nodes each having an application running that waits for connections on a given destination port are registered in a flow table. This registration information is distributed to each of the plurality of network nodes. When a packet indicating an initiation of a connection is received and it is determined that the received packet indicates the initiation of the connection on the given destination port, a network node is selected from the network nodes registered in the flow table, to which the received packet is to be forwarded. The received packet is forwarded to the selected network node and a corresponding entry is inserted into the flow table. This entry information is distributed to each of the plurality of network nodes.

16 Claims, 5 Drawing Sheets

LISTENER MECHANISM IN A DISTRIBUTED NETWORK SYSTEM

FIELD OF THE INVENTION

The present invention relates to a distributed network system and to the concept of a 'listener' in the distributed network system.

BACKGROUND OF THE INVENTION

TCP/IP (Transport Control Protocol/Internet Protocol) is a commonly used protocol for applications to set up reliable end-to-end connections in the networking world. The BSD (Berkeley Domain Sockets) socket interface is a popular network-programming interface for users to implement TCP/UDP (User Datagram Protocol) based applications. The TCP protocol has the concept of a 'listener', which signifies a server software that waits for connections on a given TCP port.

With systems becoming more complex, the significance of distributed systems is increasing.

If the TCP protocol stack is distributed (i.e. if there are multiple instances of TCP protocol stack and sockets running) on various nodes in a distributed system, the external world still looks at the whole system as a single IP-endpoint. Due to this, the incoming TCP connection requests have the same destination-port. If there are multiple applications running on multiple nodes listening to different ports, there is a need to create a mechanism to send incoming SYN requests and further TCP segments to the appropriate listener.

The problem is more complex when multiple applications on multiple cards that listen to the same TCP port have to be supported.

Existing implementations have a centralized listener which receives packets and applications take care of distributing messages to other nodes if required.

SUMMARY OF THE INVENTION

It is therefore an object of the present invention to solve the above problems and to improve the mechanism of a listening concept in a distributed network system.

The present invention proposes a method for the implementation of a distributed listener mechanism where there can be listeners for the same TCP port on multiple nodes in a distributed system, through packet snooping.

A distributed TCP implementation with a distributed listener according to the present invention is useful in addressing various system requirements like load balancing, resiliency, etc.

To be precise, the implementation of a distributed TCP listener according to the invention allows a network system to
- be more scalable. This allows the system to be scaled by adding additional nodes that can increase the number of server applications. Load sharing may be done for multiple ports or for the same port.
- be more resilient. This allows the system to be able to function with reduced capacity in spite of the loss of a processing node.
- remove "single point of failure": There is no single centralized database maintained, thus reducing the possibility of single point of failure causing the entire system to be non-functional.
- be more efficient. The implementation of the distributed listener switches the packets to the appropriate listener node at the earliest point of identification. In a system having hardware-based fast-path, the performance can further be improved.

DESCRIPTION OF THE PREFERRED EMBODIMENTS

Figure 1:
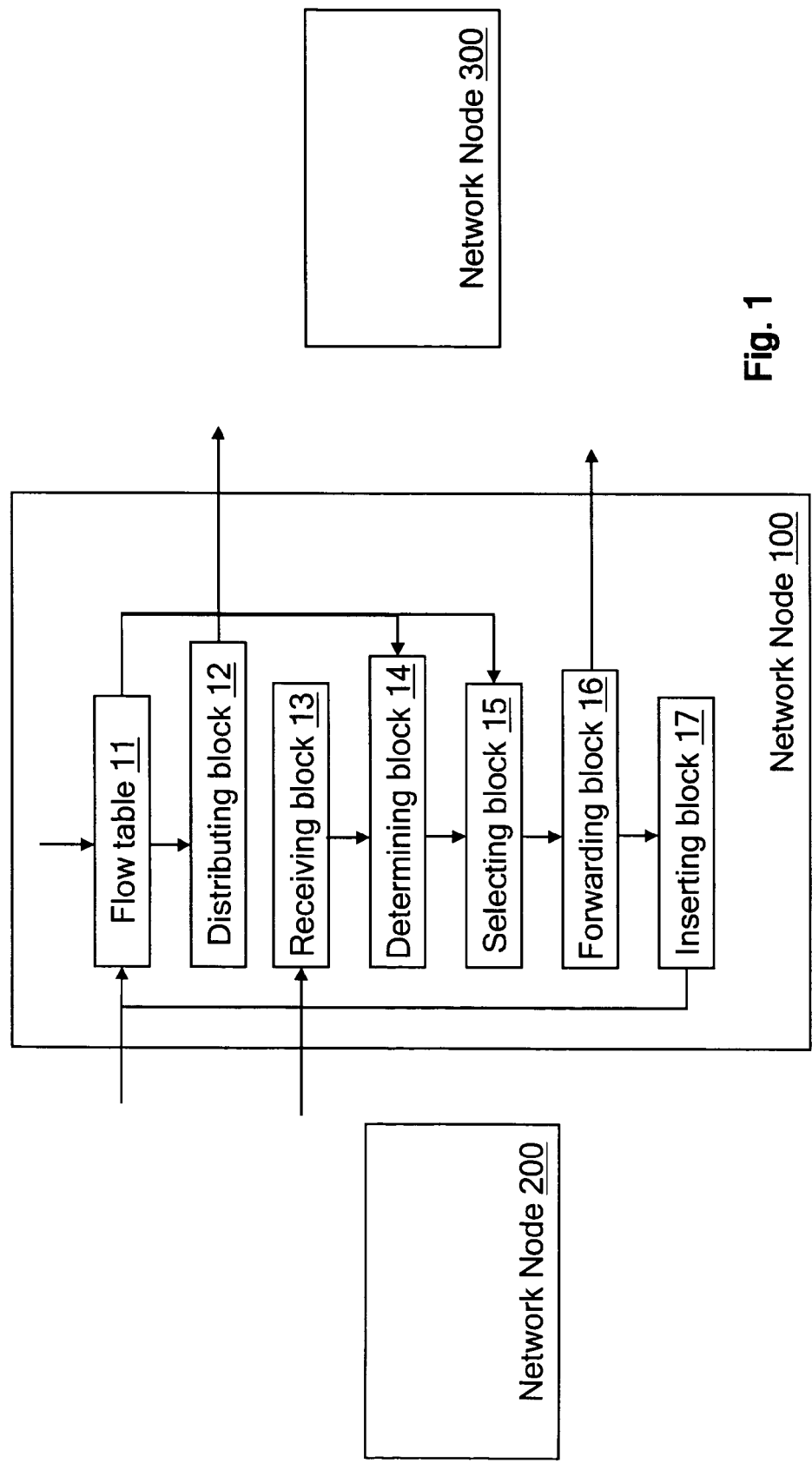
FIG. 1 shows a schematic block diagram illustrating network nodes according to an embodiment of the invention.

FIG. 1 shows a schematic block diagram illustrating network nodes 100, 200 and 300 according to an embodiment of the invention. Since all nodes 100, 200 and 300 have the same structure, only node 100 is described in greater detail. It is to be noted that only the features of the network node 100 which are relevant for understanding the invention are described, and the network node 100 may comprise further features which are necessary for its functioning in a distributed network system.

Figure 2:
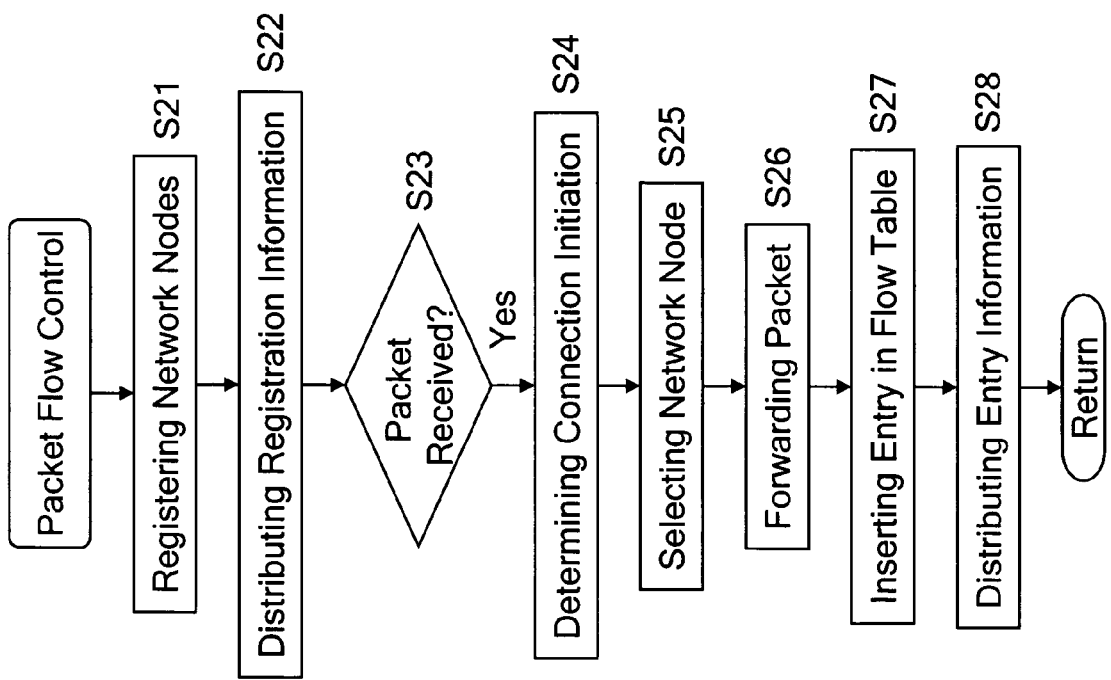
FIG. 2 shows a flow chart illustrating a packet flow control method according to the embodiment of the invention.

Moreover, FIG. 2 shows a flow chart illustrating a packet flow control method according to the embodiment of the invention.

The network node 100 is part of a distributed network system comprising a plurality of network nodes 100, 200, 300 having the same destination address. According to the invention, the network node 100 serves to control a packet flow for performing a distributed listener concept. However, as noted above, the functioning of the network node 100 is not limited to the packet flow control.

The network node 100 comprises a flow table 11, a distributing block 12, a receiving block 13, a determining block 14, a selecting block 15, a forwarding block 16 and an inserting block 17. A flow is a set of parameters within a packet that identifies the packet and is used for lookup of the packet.

In case any one of the network nodes 100, 200, 300 has an application running that waits for connections on a given destination port, the network node registers in the flow table 11 (S21). Then the distributing block 12 distributes the registration information to the other network nodes 200, 300 (S22). For example, in case an application running on the network node 100 wishes to receive packets on the given destination port, the network node 100 is registered in the flow table and this registration information is distributed to the flow tables of the other nodes 200, 300.

In case the receiving block 13 receives a packet indicating an initiation of a connection (Yes in step S23), and the determining block 14 determines that the received packet indicates the initiation of the connection on the given destination port (S24), the selecting block 15 selects a network node from the network nodes registered in the flow table 11, to which the received packet is to be forwarded (S25). The forwarding block 16 forwards the received packet to the selected network node (26), and the inserting block 17 inserts an entry into the flow table 11 (S27), the entry indicating the selected network node for the initiated connection. Finally, the distributing block 12 distributes the entry information to the other network nodes 200, 300 (S28).

It is to be understood that the arrangement of the blocks of the network node 100 shown in FIG. 1 is for a better understanding of the invention and that blocks can be combined or further divided to perform the functions as described above. It is further noted that some or all above-described functions may be performed by a computer program product e.g. by using a central processing unit of the network node 100 with dedicated storage means.

The network node 100 may further comprise a network processor having a lookup table for programming the entry information and switching means for switching packets belonging to the initiated connection to the selected network node in accordance with the lookup table of the network processor via a hardware fast-path.

Moreover, the network node 100 may further comprise detecting means for detecting that an application waits for connections on the port of the network node 100. In this case, when the determining block 14 determines that the received packet indicates the initiation of the connection on the port of the network node 100, the forwarding block 16 forwards the received packet to the waiting application.

Furthermore, the network node 100 may further comprise weighting means for applying weights to the registered network nodes in the flow table 11. The selecting block 15 then may select the network node from the weighted registered network nodes in accordance with the applied weights. These weights may be based on a configured or internal policy, e.g. based on factors like load of nodes, configuration of a node, etc.

Alternatively or in addition, the network node 100 may further comprise prioritizing means for prioritizing the registered network nodes in the flow table 11, and the selecting block 15 may select the network node in accordance with a priority given to the registered network nodes. These priorities may be based on a configured or internal policy, e.g. based on factors like load of nodes, processing capability of nodes, etc.

The flow table 11 may comprise a control flow table for weighting and/or prioritizing the registered network nodes, and a forwarding flow table for forwarding the received packet to the selected node in accordance with entries in the control flow table. The composition of the control flow table may be determined based on an internal or a configured policy. As can be understood from the above, an implementation of a distributed listener that takes advantage of a distributed packet snooper mechanism is proposed. This will be described in greater detail below.

It is to be noted that many of the modern implementations of distributed networking systems use hardware based fast paths for packet forwarding. An implementation example of the invention utilizes the hardware-based fast paths for switching packets to the appropriate node. However, the concepts of the invention are equally applicable for software-based data-paths.

In the following, the functions performed in steps S24 to S26 in FIG. 2 are described in greater detail with respect to an implementation example of the invention adopting a distributed TCP protocol stack.

Applications Listening on Different TCP Ports:

If there are two nodes—200 and 300, and if there are two applications App-200 and App-300 listening to port port-200 and port-300 respectively, the hardware of the respective nodes 200 and 300 is programmed with rules such that all incoming SYN packets received on the port-200 are delivered to the App-200 on the node 200, and those received on the port-300 are delivered to the App-300 on the node 300.

Applications Listening on the Same TCP Port:

If there are two nodes—200 and 300, and if there are two applications App-200 and App-300 listening to the same TCP port (say port-p) (i.e. a given destination port), the hardware of any nodes in the distributed system is programmed with rules such that all incoming SYN packets received on any TCP port are sent to the local software of the node. A SYN is a type of TCP packet sent to initiate a connection with a listening TCP port. The local software maintains a list (i.e. the flow table 11) of current listening-applications and a policy associated with them, to select one of the nodes (an example of the policy may be a prioritised, weighted list). The SYN packet is delivered to one of the listeners (i.e. to an application running on a node of the flow table 11) based on the priority and weight of that listener as compared to other listeners in the system. When the listener receives this SYN packet, it then programs additional rules (more specific rule indicating the source IP address and source TCP port numbers) in the hardware to enable forwarding of subsequent TCP segments on the same flow to be received at the same application. This new rule is a more specific rule, and has higher priority than the generic rule that was present for port-p.

In other words, information received in the user-plane is used to add control-plane rules dynamically for this case.

The proposed implementation completely adheres to the standard BSD syntax and semantics, and applications do not require any modifications. Extensions may be added to make the implementation more efficient.

The BSD (Berkeley Domain Sockets) socket interface is a popular network programming interface for users to implement TCP/UDP based applications. The Transmission Control Protocol (TCP) is intended for use as a highly reliable host-to-host protocol between hosts in packet-switched computer communication networks, and in interconnected systems of such networks.

The weights for the applications may be laid down as a policy for the system, or be configured using a mechanism like socket option, where each application requests for a specific weight (based on functions like the load-handling capability and policy of the application.)

The priority list which may be laid down in the flow table 11 or may be referred to when writing into the flow table is to identify the application for a sequence of SYN requests that are received by the system.

For example, if there are the two applications App-200 and App-300 registered for port 80, and the policy is round-robin with equal weights for all applications, SYN-1 (and all the further packets for this connection) are sent to application App-200

SYN-2 (and all the further packets for this connection) are sent to application App-300

SYN-3 (and all the further packets for this connection) are sent to application App-200

SYN-4 (and all the further packets for this connection) are sent to application App-300

If the weight for the two applications App-200 and App-300 registered for the port 80 are 2 and 1, SYN-1 (and all the further packets for this connection) are sent to application App-200

SYN-2 (and all the further packets for this connection) are sent to application App-200

SYN-3 (and all the further packets for this connection) are sent to application App-300

SYN-4 (and all the further packets for this connection) are sent to application App-200

SYN-5 (and all the further packets for this connection) are sent to application App-200

SYN-6 (and all the further packets for this connection) are sent to application App-300

In the following, the functions performed in steps S21 to S23, S27 and S28 in FIG. 2 are described in greater detail with respect to the distributed TCP protocol stack.

Applications that wish to receive packets on any node open a socket, and perform a bind system call to bind to a particular port which is the destination port in the <Source address, Source Port, Destination Address, Destination Port, Protocol> tuple. The socket layer informs the master socket layer of the new port registration. The master distributes this information to the socket layers on all nodes. For each <SA=any, SP=any, DA=any, DP=X, Proto=TCP>, a list of nodes (i.e. the flow table 11) which registered for the ports is maintained. This is also distributed to all the nodes. The TCP listener semantics in the TCP protocol may be realised through the listen and the bind system calls in the BSD socket API (Application Program Interface).

When packets arrive at a node, e.g. at the receiving block 13 in network node 100 in FIG. 1, the determining block 14 being part of a packet snooper of the network node 100 intercepts it and looks up this table. When the first TCP packet with SYN bit set for a given <SA=new, SP=new, DA, DP=X, Proto=TCP> arrives, the node 200 is chosen, and the packet is forwarded to the node 200. A new entry for <SA=new, SP=new, DA, DP=X, Proto=TCP→node=200> is inserted by the packet snooper into its table (i.e. the flow table 11), where 200 is the first node registered for this port, and the packet is forwarded to the node 200. This information is also distributed to the packet snooper modules on all nodes in the distributed system. In other words, the packet snooper performs the functions of the determining block 14, the selecting block 15, the forwarding block 16, the inserting block 17 and the distributing block 12 in FIG. 1. On a hardware-based forwarding system, the entry into the table is programmed in a lookup table of a network processor (RAM (Random Access Memory)-based, TCAM (Ternary Content Addressable Memory)-based, hash-table based, etc.) on each node. As a result, any further packet destined to <SA=new, SP=new, DA, DP=X, Proto=TCP> that arrives on any node is switched to node 200 through the hardware fast-path. When the first packet reached node 200, the new connection was initiated, and was established after the handshake.

The switching of any further packet to the node 200 continues until a FIN/RUST packet is received or sent out for this connection, resulting in the termination of the connection. The entries in the packet snooper, i.e. Inn the flow table, and in the network processor lookup tables are added and removed gracefully in such a way that the entries are present until the entire TCP handshake is completed. Alternatively, the switching of any further packet to the node 200 is terminated when the connection handle is closed by the application on node 200.

When the original socket is closed by the applications, the information is distributed to all the nodes, and the appropriate entries are removed.

Figure 4:
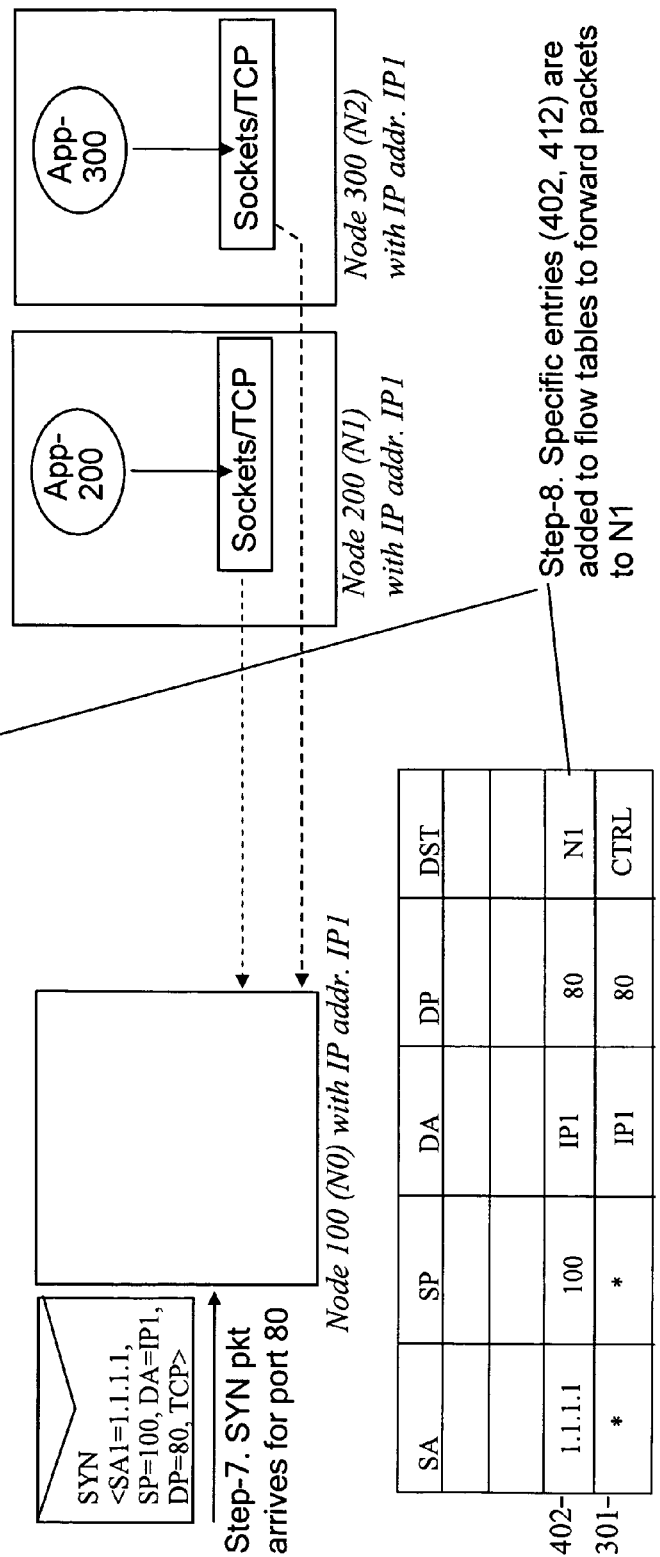
Figure 5:
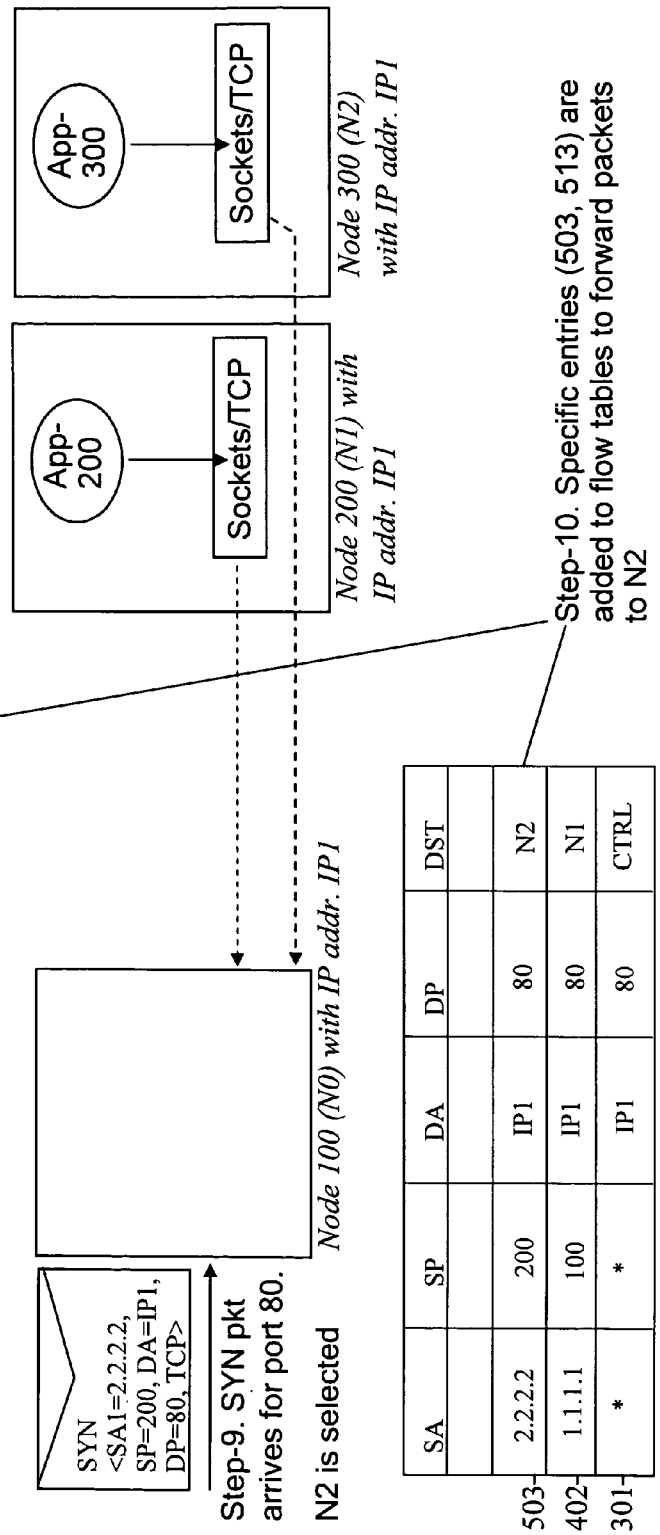

In the following, the distributed listener method according to an implementation example of the invention will be described by referring to FIGS. 3 to 5.

Figure 3:
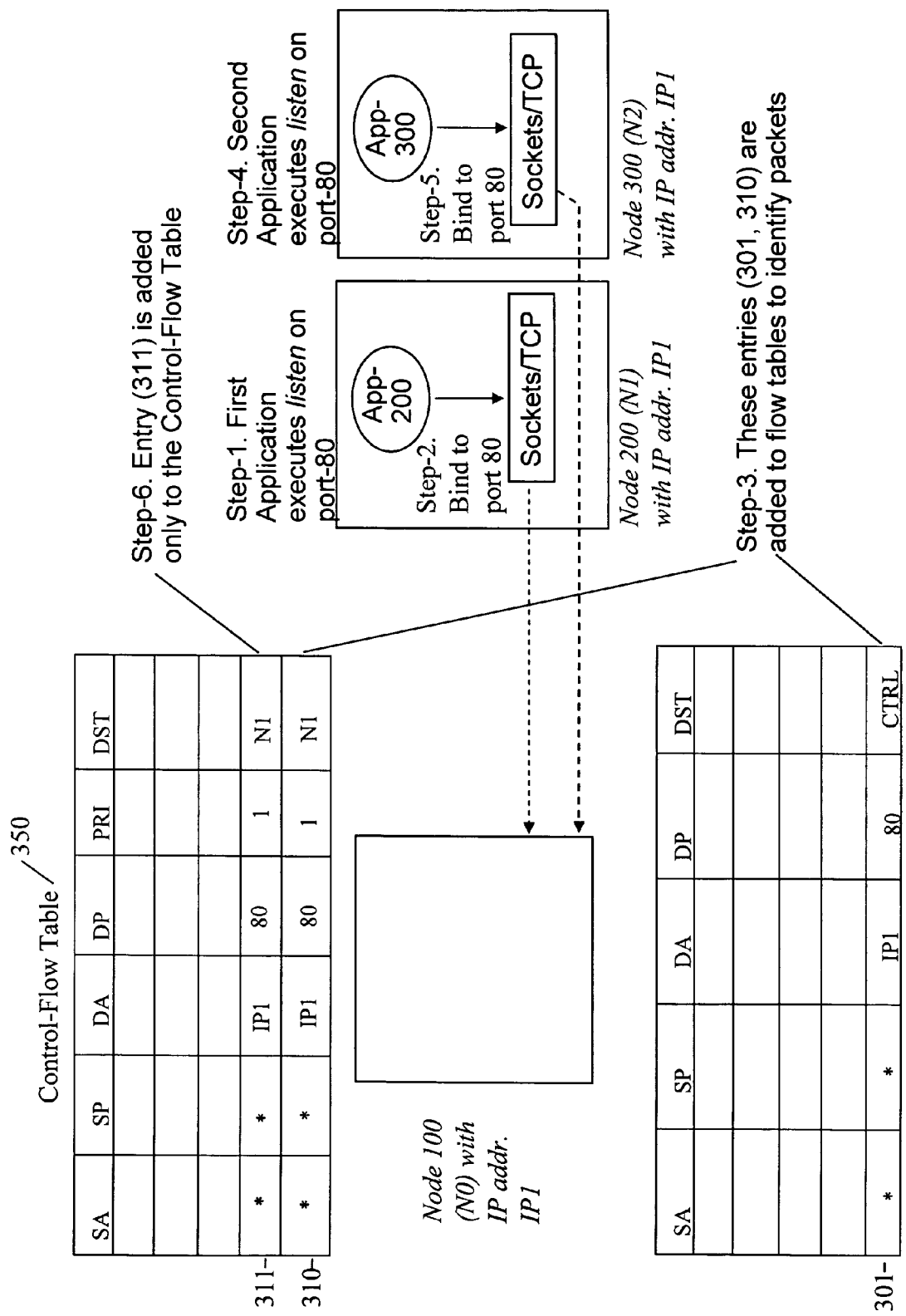
FIGS. 3 to 5 show schematic diagrams illustrating an implementation example of the invention.

FIG. 3 shows network nodes 100, 200 and 300 similar to that shown in FIG. 1. The network node 100 has a flow table comprising a forwarding flow table 360 and a control flow table 350. Equally, the nodes 200 and 300 comprise flow tables corresponding to the flow table of the node 100. The entries in these lookup tables are organized in the best-match or longest-prefix order, with the lookup done in the top to bottom direction for the first match.

In case a first application App-200 on the node 200 (N1, IP1) executes a listen operation on a port 80 (step 1), the first application opens a socket on the node 200 and performs a bind system call to bind to the port 80 (step 2). The socket layer of the node 200 informs the master socket layer about the new port registration. The master distributes this information to the socket layers on all nodes in the distributed network system. As a result, entries 301 and 310 are added to the flow tables in the nodes to capture packets destined to the port 80 (step 3). To be precise, to the forwarding flow tables of the nodes 100, 200, 300 the destination address of N1, i.e. IP1, is added as destination address (DA) and 80 is added as destination port (DP). CTRL indicating a control packet is added as destination (DST). To the control flow tables of the nodes 100, 200, 300 IP1 is added as destination address (DA), 80 is added as destination port (DP), and N1 is added as destination (DST). The weightage of N1 is defined as 1 in this case.

In case a second application App-300 on the node 300 (N2, IP1) executes a listen operation on the port 80 (step 4), the second application opens a socket on the node 300 and performs a bind system call to bind to the port 80 (step 5). The socket layer of the node 300 informs the master socket layer about the new port registration. The master distributes this information to the socket layers on all nodes in the distributed network system. As a result, an entry 311 is added only to the control flow tables in the nodes (step 6). To be precise, to the control flow tables of the nodes 100, 200, 300 IP1 is added as destination address (DA), 80 is added as destination port (DP), and N2 is added as destination (DST). N2 is registered with the weightage 2 (by policy.)

In case a SYN packet arrives at the node 100 (step 7 in FIG. 4), it is checked whether the control flow table 350 comprises an entry for the destination port indicated in the SYN packet. Since the flow table has N1 and N2 registered for the port 80 indicated in the SYN packet as destination port (entries 310 and 311), N1 is selected as node to which the SYN packet and further packets belonging to the connection initiated by the SYN packet are to be forwarded. In step 8 corresponding entries 412 and 402 are added to the control flow table 350 and forwarding flow table 360 respectively to forward the packets to N1. To be precise, in the forwarding and control flow tables the source address SA1=1.1.1.1, the source port SP=100, the destination address DA=IP1 and the destination port DP=80 of the SYN packet are added. The node N1 is added as destination. In the control flow tables, 1 is added as priority for forwarding packets belonging to the connection initiated by the SYN packet to N1.

In case a further SYN packet arrives at the node 100 (step 9 in FIG. 5), it is checked whether the flow table comprises an entry for the destination port indicated in the SYN packet. Since the control flow table 350 has N1 and N2 registered for the port 80 indicated in the SYN packet, N1 having same weightage as N2 but having already been selected, N2 is selected as node to which the SYN packet and further packets belonging to the connection initiated by the SYN packet are to be forwarded. In step 10 corresponding entries 503 and 513 are added to the forwarding and control flow tables 360 and 350 to forward the packets to N2. To be precise, in the forwarding and control flow tables the source address SA1=2.2.2.2, the source port SP=200, the destination address DA=IP1 and the destination port DP=80 of the SYN packet are added. The node N2 is added as destination. In the control flow tables, 1 is added as priority for forwarding packets belonging to the connection initiated by the SYN packet to N2.

In other words, a method of controlling a packet flow in a distributed network system comprising a plurality of network nodes having the same destination address and destination port is disclosed. Network nodes each having an application running that waits for connections on a given destination port are registered in a flow table. This registration information is distributed to each of the plurality of network nodes. When a packet indicating an initiation of a connection is received and it is determined that the received packet indicates the initiation of the connection on the given destination port, a network node is selected from the network nodes registered in the flow table, to which the received packet is to be forwarded. The received packet is forwarded to the selected network node and a corresponding entry is inserted into the flow table. This entry information is distributed to each of the plurality of network nodes.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method, comprising:
registering, by a processor, network nodes having a same destination address, each network node having an application running that waits for connections on a same destination port, in a flow table, thereby obtaining registration information;
causing the registration information to be distributed to each of the plurality of network nodes;
receiving a packet indicating an initiation of a connection;
determining, by the processor, that the received packet indicates the initiation of the connection on the same destination port;
selecting, by the processor, a network node from the network nodes registered in the flow table, to which the received packet is to be forwarded;
causing the received packet to be forwarded to the selected network node;
inserting, by the processor, an entry into the flow table, the entry indicating the selected network node for the initiated connection, thereby obtaining entry information; and
causing the entry information to be distributed to each of the plurality of network nodes.

2. The method according to claim 1, comprising:
inserting the entry information in a lookup table of a network processor; and
switching packets belonging to the initiated connection to the selected network node in accordance with the lookup table of the network processor via a hardware fast-path.

3. The method according to claim 1, comprising:
detecting that an application waits for connections on the port of a network node;
determining that the received packet indicates the initiation of the connection on the port of the network node; and
causing the received packet to be forwarded to the application.

4. The method according to claim 1, comprising:
applying weights to the registered network nodes in the flow table, the selecting comprising selecting the network node from the weighted registered network nodes in accordance with the applied weights.

5. The method according to claim 1, comprising:
prioritizing the registered network nodes in the flow table, the selecting comprising selecting the network node in accordance with a priority given to the registered network nodes.

6. An apparatus, comprising at least one processor and at least one memory storing computer program code, wherein the at least one memory and stored computer program code are configured to, with the at least one processor, cause the apparatus to at least:
register network nodes having a same destination address, each network node having an application running that waits for connections on a same destination port, in a flow table, as registration information;
cause the registration information to be distributed to each of the plurality of network nodes; and
receive a packet indicating an initiation of a connection,
determine that the received packet indicates the initiation of the connection on the same destination port;
select a network node from the network nodes registered in the flow table, to which the received packet is to be forwarded,
cause the received packet to be forwarded to the selected network node,
insert an entry into the flow table, the entry indicating the selected network node for the initiated connection, thereby obtaining entry information, and
cause the entry information to be distributed to each of the plurality of network nodes.

7. The apparatus according to claim 6, wherein the at least one memory and stored computer program code are configured to, with the at least one processor, further cause the apparatus to:
insert-the entry information in a lookup table; and
switch packets belonging to the initiated connection to the selected network node in accordance with the lookup table via a hardware fast-path.

8. The apparatus according to claim 6, wherein the at least one memory and stored computer program code are configured to, with the at least one processor, further cause the apparatus to:
detect that an application waits for connections on the port of the network node;
determine that the received packet indicates the initiation of the connection on the port of the network node;
cause the received packet to be forwarded to the application.

9. The apparatus according to claim 6, wherein the at least one memory and stored computer program code are configured to, with the at least one processor, further cause the apparatus to:
apply weights to the registered network nodes in the flow table; and
select the network node from the weighted registered network nodes in accordance with the applied weights.

10. The apparatus according to claim 6, wherein the processor is configured to prioritize the registered network nodes in the flow table, wherein the processor is further configured to select the network node in accordance with a priority given to the registered network nodes.

11. The apparatus according to claim 6, wherein the flow table comprises a control flow table for at least one of operations of weighting and prioritizing the registered network nodes, and a forwarding flow table configured to forward the received packet to the selected node in accordance with entries in the control flow table.

12. A non-transitory computer readable medium stored with, embodied with, or encoded with computer program instructions, the instructions comprising instructions configured to:
register network nodes having a same destination address, each network node having an application running that waits for connections on a same destination port, in a flow table, thereby obtaining registration information;
cause the registration information to be distributed to each of the plurality of network nodes;

cause a packet indicating an initiation of a connection to be received;
determine that the received packet indicates the initiation of the connection on the same destination port;
select a network node from the network nodes registered in the flow table, to which the received packet is to be forwarded;
cause the received packet to be forwarded to the selected network node;
insert an entry into the flow table, the entry indicating the selected network node for the initiated connection, thereby obtaining entry information; and
cause the entry information to be distributed to each of the plurality of network nodes.

13. An apparatus, comprising:
a processor configured to register network nodes having a same destination address, each network node having an application running that waits for connections on a same destination port, as registration information;
a transmitter configured to distribute the registration information to each of the plurality of network nodes;
a receiver configured to receive a packet indicating an initiation of a connection,
wherein the processor is configured to determine that the received packet indicates the initiation of the connection on the same destination port and to select a network node from the network nodes registered in the flow table, to which the received packet is to be forwarded,
wherein the transmitter is configured to forward the received packet to the selected network node; and
a memory configured to insert an entry into the flow table, the entry indicating the selected network node for the initiated connection, thereby obtaining entry information,
wherein the transmitter is further configured to distribute the entry information to each of the plurality of network nodes.

14. An apparatus, comprising:
a flow table for registering network nodes having a same destination address, each network node having an application running that waits for connections on a same destination port, as registration information;
means for distributing the registration information to each of the plurality of network nodes;
means for receiving a packet indicating an initiation of a connection;
means for determining that the received packet indicates the initiation of the connection on the same destination port;
means for selecting a network node from the network nodes registered in the flow table, to which the received packet is to be forwarded;
means for forwarding the received packet to the selected network node; and
means for inserting an entry into the flow table, the entry indicating the selected network node for the initiated connection, thereby obtaining entry information,
wherein the means for distributing are configured to distribute the entry information to each of the plurality of network nodes.

15. An apparatus, comprising at least one processor, the at least one processor configured to cause the apparatus to at least:
register network nodes having a same destination address, each network node having an application running that waits for connections on a same destination port, in a flow table, thereby obtaining registration information,
cause the registration information to be distributed to each of the plurality of network nodes,
receive a packet indicating an initiation of a connection,
determine that the received packet indicates the initiation of the connection on the same destination port,
select a network node from the network nodes registered in the flow table, to which the received packet is to be forwarded,
cause the received packet to be forwarded to the selected network node,
insert an entry into the flow table, the entry indicating the selected network node for the initiated connection, thereby obtaining entry information, and
cause the entry information to be distributed to each of the plurality of network nodes.

16. The method according to claim 1, wherein the flow table comprises a control flow table for at least one of operations of weighting and prioritizing the registered network nodes, and a forwarding flow table configured to forward the received packet to the selected node in accordance with entries in the control flow table.

* * * * *